(12) United States Patent
Hiroshige et al.

(10) Patent No.: US 7,747,623 B2
(45) Date of Patent: Jun. 29, 2010

(54) PRODUCT DESIGN SUPPORT METHOD AND SYSTEM

(75) Inventors: Yuzo Hiroshige, Tokyo (JP); Yasuhiro Hamatsuka, Yokohama (JP); Akio Saito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 811 days.

(21) Appl. No.: 11/703,670

(22) Filed: Feb. 8, 2007

(65) Prior Publication Data
US 2007/0198289 A1    Aug. 23, 2007

(30) Foreign Application Priority Data
Feb. 8, 2006    (JP) ............... 2006-030414

(51) Int. Cl.
*G06F 7/00* (2006.01)
*G06F 19/00* (2006.01)
(52) U.S. Cl. ............... 707/736; 700/97
(58) Field of Classification Search ......... 707/100, 707/101, 104.1; 700/95, 97; 705/7
See application file for complete search history.

(56) References Cited

U.S. PATENT DOCUMENTS

| | | | |
|---|---|---|---|
| 3,500,817 A | 3/1970 | Read | |
| 7,487,577 B2 * | 2/2009 | Ishida et al. | ............... 29/403.1 |
| 2002/0099587 A1 * | 7/2002 | Kakihana et al. | ............... 705/7 |
| 2003/0233160 A1 * | 12/2003 | Ishida | ............... 700/106 |
| 2004/0044562 A1 * | 3/2004 | Ueno et al. | ............... 705/10 |
| 2004/0054516 A1 * | 3/2004 | Oyasato et al. | ............... 703/22 |
| 2004/0153184 A1 * | 8/2004 | Shima | ............... 700/97 |

FOREIGN PATENT DOCUMENTS

| | | |
|---|---|---|
| JP | 09-160959 | 6/1997 |
| JP | 2005-165469 | 6/2005 |

OTHER PUBLICATIONS

Author: A. Kriwet, E. Zussman and G. Seliger; Title: Systematic Integration of Design-for-Recycling into Product Design, Date: 1995; pp. 1-8.*

* cited by examiner

*Primary Examiner*—Tony Mahmoudi
*Assistant Examiner*—MD. I Uddin
(74) *Attorney, Agent, or Firm*—Antonelli, Terry, Stout & Kraus, LLP.

(57) ABSTRACT

A product design support method and system are disclosed in which assuming that a globally distributed commodity is disposed of as a waste product by different recycle methods in different regions or countries, the recycle cost and environmental load accrued by different processing methods are quantified using the product design information thereby to assist in the design improvement. The product information and the regional recycle characteristics are input to determine the recycle method by region. Further, the recycle cost/environmental load by region are quantified based on the product design information using the basic unit information of the recycle cost and environmental load by region.

10 Claims, 14 Drawing Sheets

FIG.3A

PART COMPONENT INFORMATION

| PARENT PART | CHILD PART | NUMBER OF UNITS | UNIT |
|---|---|---|---|
| A | A1 | 1 | PC |
| A | A2 | 1 | PC |
| A | A3 | 1 | PC |
| A | A4 | 1 | PC |
| A1 | A11 | 1 | PC |
| A1 | A12 | 2 | PC |
| A1 | A13 | 1 | PC |
| A1 | A14 | 2 | PC |

PART ATTRIBUTE INFORMATION

| PART | PART CLASS | MATERIAL CODE | WEIGHT (g) | CHEMICAL SUBSTANCE CODE | CONTENT | CONTENT UNIT |
|---|---|---|---|---|---|---|
| A | ELECTRIC POWER TOOL | — | — | — | — | — |
| A1 | SUBSTRATE ASSEMBLY | — | — | — | — | — |
| A2 | TOOL | — | 20 | — | — | — |
| A3 | CASE | ABS | 100 | — | — | — |
| A4 | MOTOR | Fe,Cu | 60 | — | — | — |
| A11 | RADIATION PLATE | Al | 30 | — | — | — |
| A12 | BATTERY | — | 200 | Hg | 30 | % |
| A13 | CAPACITOR | — | 5 | — | — | — |
| A14 | SUBSTRATE | — | 25 | — | — | — |

⋮

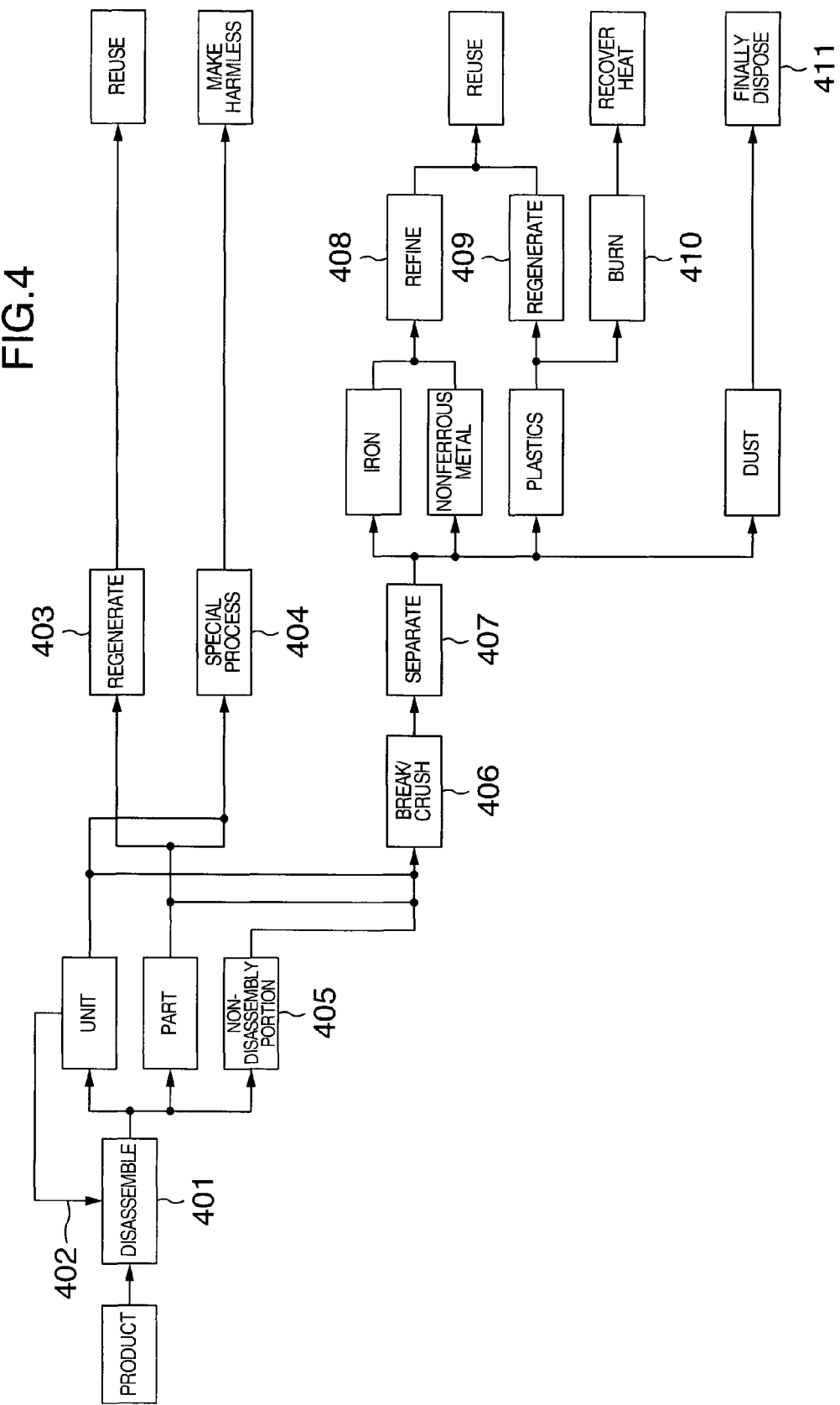

FIG.5

| REGION/ COUNTRY | PRODUCT/ UNIT | PART CLASS | MATERIAL CODE | CHEMICAL SUBSTANCE CODE | MINIMUM MASS |
|---|---|---|---|---|---|
| EUROPE | ELECTRIC POWER TOOL | TOOL | | | 20 |
| | | TOOL STOPPER | | | |
| | | MOTOR | | | 50 |
| | | | | Hg | 5 |
| JAPAN | ELECTRIC POWER TOOL | TOOL | | | |
| | | SUBSTRATE ASSEMBLY | | | |
| | | MOTOR | | | |
| | | | PS | | 50 |
| | | | ABS | | 50 |
| | SUBSTRATE ASSEMBLY | | Al | | 25 |

FIG.6

| REGION/COUNTRY | INTENDED OBJECT | PROCESS | RECOVERED OBJECT | | END |
|---|---|---|---|---|---|
| | | | RECOVERED OBJECT | RATIO | |
| EUROPE | MOTOR | BREAK/SEPARATE | IRON | 0.95 | |
| | | | COPPER | 0.90 | |
| | IRON | IRON REFINING | IRON | 0.90 | ○ |
| | COPPER | COPPER REFINING | COPPER | 0.96 | ○ |
| | ALUMINUM | ALUMINUM REFINING | ALUMINUM | 0.97 | ○ |
| | MERCURY | MAKE HARMLESS | | | ○ |
| | | BREAK/SEPARATE | IRON | 0.93 | |
| | | | COPPER | 0.90 | |
| | | | ALUMINUM | 0.90 | |
| JAPAN | SUBSTRATE ASSEMBLY | COPPER REFINING | GOLD | 0.97 | ○ |
| | | | COPPER | 0.94 | ○ |
| | MOTOR | BREAK/SEPARATE | IRON | 0.95 | |
| | | | COPPER | 0.90 | |
| | IRON | IRON REFINING | IRON | 0.90 | ○ |
| | COPPER | COPPER REFINING | COPPER | 0.96 | ○ |
| | PLASTICS | REGENERATE | PLASTICS | 0.80 | ○ |
| | ALUMINUM | ALUMINUM REFINING | ALUMINUM | 0.88 | ○ |
| | | BREAK/SEPARATE | IRON | 0.93 | |
| | | | COPPER | 0.90 | |
| | | | ALUMINUM | 0.90 | |

FIG.8A

COST (PROCESSING METHOD)

| REGION/ COUNTRY | PROCESSING METHOD | OBJECT | BASIC UNIT | BASIC UNIT UNIT | ACCRUAL UNIT |
|---|---|---|---|---|---|
| EUROPE | DISASSEMBLE | | 0.52 | EUR | min |
| | BREAK/SEPARATE | | 0.067 | EUR | kg |
| | IRON REFINING | Fe | -0.013 | EUR | kg |
| | COPPER REFINING | Cu | -0.053 | EUR | kg |
| | ALUMINUM REFINING | Al | -0.067 | EUR | kg |
| | MAKE HARMLESS | SUBSTRATE | -0.133 | EUR | kg |
| JAPAN | | | | | |

ENVIRONMENTAL LOAD (PROCESSING METHOD)

| REGION/ COUNTRY | PROCESSING METHOD | OBJECT | ENVIRONMENTAL LOAD ITEM | BASIC UNIT | BASIC UNIT UNIT | ACCRUAL UNIT |
|---|---|---|---|---|---|---|
| EUROPE | DISASSEMBLE | | ELECTRIC POWER | 0.005 | wh | g |
| | BREAK/ SEPARATE | | ELECTRIC POWER | 0.02 | wh | g |
| | REFINE | Fe | ELECTRIC POWER | 0.1 | wh | g |
| | REFINE | Cu | ELECTRIC POWER | 0.15 | wh | g |
| | REFINE | Al | ELECTRIC POWER | 0.2 | wh | g |
| | MAKE HARMLESS | SUBSTRATE | ELECTRIC POWER | 0.3 | wh | g |
| JAPAN | | | | | | |

PRODUCT MODEL

| TYPE | SHIPMENT DESTINATION | NUMBER OF UNITS SHIPPED |
|---|---|---|
| A | EU | 100 |
| A | JPN | 50 |
| Note | USA | 500 |
| Note | JPN | 1000 |
| Desktop | EU | 1000 |
| Desktop | USA | 2500 |

| REGION/ COUNTRY | EVALUATION ITEM | | WEIGHTING COEFFICIENT |
|---|---|---|---|
| EUROPE | COST | PRODUCTION COST | 100 |
| | | RECYCLE COST | 50 |
| | ENVIRONMENTAL LOAD | RECYCLE RATE | -40 |
| | | $CO_2$ EMISSION AMOUNT | 30 |
| | | RESOURCE EXHAUSTION AMOUNT | 25 |
| JAPAN | COST | PRODUCTION COST | 100 |
| | | RECYCLE COST | 80 |
| | ENVIRONMENTAL LOAD | RECYCLE RATE | -40 |
| | | $CO_2$ EMISSION AMOUNT | 50 |
| | | RESOURCE EXHAUSTION AMOUNT | 60 |

⋮

PRODUCT DESIGN SUPPORT METHOD AND SYSTEM

INCORPORATION BY REFERENCE

The present application claims priority from Japanese application JP2006-030414 filed on Feb. 8, 2006, the content of which is hereby incorporated by reference into this application.

BACKGROUND OF THE INVENTION

This invention relates to a method and a system for assisting in the study of the design improvement and the business strategy by quantitatively evaluating the recycle cost and the recycle environmental load commensurate with the method of recycling the waste products varied from one region to another, based on the design information in the design stage of a globally distributed commodity.

A technique for quantifying the cost and the environmental load accrued for recycling a waste product is disclosed in U.S. Pat. No. 3,500,817 entitled "Design support Method and Apparatus". This technique, however, quantifies the cost and the environmental load accrued on the assumption that a waste product is processed for recycle by a specified single processing method.

On the other hand, JP-A-2005-165469 entitled "Evaluation Apparatus, Evaluation Method and Program" discloses a technique for evaluation for each strategic place of production by preparing the data including the cost by region/country. In this technique, however, the environmental load and cost of a product for the whole life cycle are evaluated based on a fixed recycle characteristic.

In recent years, rules and regulations obligating the manufacturers and importers to recover and recycle waste commodities have been enacted in many countries and regions of the world. They include the various recycle laws and regulations in Japan, the WEEE (Waste Electrical and Electronic Equipment) ordinance in Europe (obligating the recovery and recycle of waste electrical equipment), the Waste Electronic Equipment Recycle Law, California (SB20/50) [Senate Bill 20/50] and the product recycle regulations in a plurality of states in U.S.A, the Recycle Law in South Korea and the Waste Electronic Equipment Recycle Law in the mainland China. The enterprises manufacturing and globally distributing commodities are now required to recover and recycle the commodities on global basis. The interpretation of the regulations and the processing techniques or the recycle cost are varied from one country/region to another, and therefore, specific recycle processes carried out in those countries and regions are considerably different from each other. As a result, the cost and the environmental load accrued by the product recycle are also varied from one country/region to another.

SUMMARY OF THE INVENTION

An object of this invention is to provide a method and a system for calculating the cost and the environmental load accrued when a product is recycled by the recycle method in each country/region using the recycle method employed in the country/region as one of parameters.

Another object of this invention is to provide a method and a system for calculating the total recycle cost and the total recycle environmental load during the product distribution period taking the shipment strategy into consideration, based on the calculated regional recycle cost, the calculated recycle environmental load information and the product shipment strategy information for each country/region.

Still another object of the invention is to provide a recycle method superior in the total aspects of the recycle cost and the environmental load selected from a plurality of different recycle methods in the same region.

In order to achieve the objects described above, according to one aspect of the invention, there is provided a method of quantitatively evaluating the recycle cost and recycle environmental load taking the regional recycle characteristic at the time of occurrence of a waste product into consideration, by the recycle method determining logic and the recycle cost and environmental load calculation method based on the product component information, the regional recycle characteristic information and the common/regional recycle cost and environmental load basic unit information.

According to another aspect of the invention, there is provided a system for quantitatively evaluating the recycle cost and environmental load taking the regional recycle characteristic at the time of occurrence of a waste product into consideration, by the recycle method determining logic, the recycle cost and environmental load calculation method based on the product component information, the regional recycle characteristic information and the common/regional recycle cost and environmental load basic unit information.

According to still another aspect of the invention, there is provided a method of quantifying the total recycle cost and the total recycle environmental load during the product shipment period taking the regional product shipment strategy information into consideration in addition to the quantitative values of the recycle cost and the environmental load.

According to yet another aspect of the invention, there is provided a system for quantifying the total recycle cost and the total recycle environmental load during the product shipment period taking the regional product shipment strategy information into consideration in addition to the quantitative values of the recycle cost and the environmental load.

According to a further aspect of the invention, there is provided a method of extracting a recycle method superior in total aspects of the recycle cost and the recycle environmental load from a plurality of recycle methods in the same region.

According to a still further aspect of the invention, there is provided a system for extracting a recycle method superior in total aspects of the recycle cost and the recycle environmental load from a plurality of recycle methods in the same region.

According to this invention, in the case where a globally distributed commodity goes out of use in globally wide regions, the recycle cost and the environmental load can be quantitatively evaluated from the product design information in accordance with the recycle characteristic of each of the regions. As a result, the life cycle cost and the environmental load of the globally distributed commodity can be grasped at the time of design, thereby making it possible to offer the design assistance to reduce the commodity life cycle cost and the environmental load.

Also, by taking the information on the regional shipment strategy for a commodity into consideration, the recycle cost and the environmental load of the particular commodity in the global market can be totally grasped at the time of commodity design. As a result, the life cycle cost and environmental load of the globally distributed commodity can be grasped and utilized to study the corporate policy study and review of the commodity strategy.

Further, the extraction of a recycle method superior in total aspects of the recycle cost and the recycle environmental load from a plurality of recycle methods for a specific region can be utilized to select a recycle processing organization in the specific region.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are diagrams showing an example of the product information database for an example of the processing flow according to the first embodiment of the invention.

FIG. 4 is a diagram showing a general application of the recycle flow according to the first embodiment of the invention.

FIG. 5 is a diagram showing an example of the regional disassembly part information stored in the regional recycle characteristic information database for an example of the processing flow according to the first embodiment of the invention.

FIG. 6 is a diagram showing an example of the regional recycle characteristic information database for an example of the processing flow according to the first embodiment of the invention.

FIGS. 8A and 8B are diagrams showing an example of the recycle cost basic unit database and the recycle environmental load basic unit database for an example of the processing flow according to the first embodiment of the invention.

FIG. 11 is a diagram showing an example of the product shipment strategy information database for an example of the processing flow according to the second embodiment of the invention.

FIG. 14 is a diagram showing an example of the CSR (Corporate Social Responsibility) strategy information data for an example of the processing flow according to the third embodiment of the invention.

DETAILED DESCRIPTION OF THE EMBODIMENTS

A method of implementing this invention is explained below with reference to FIGS. 1 to 14.

Embodiment 1

Figure 1:
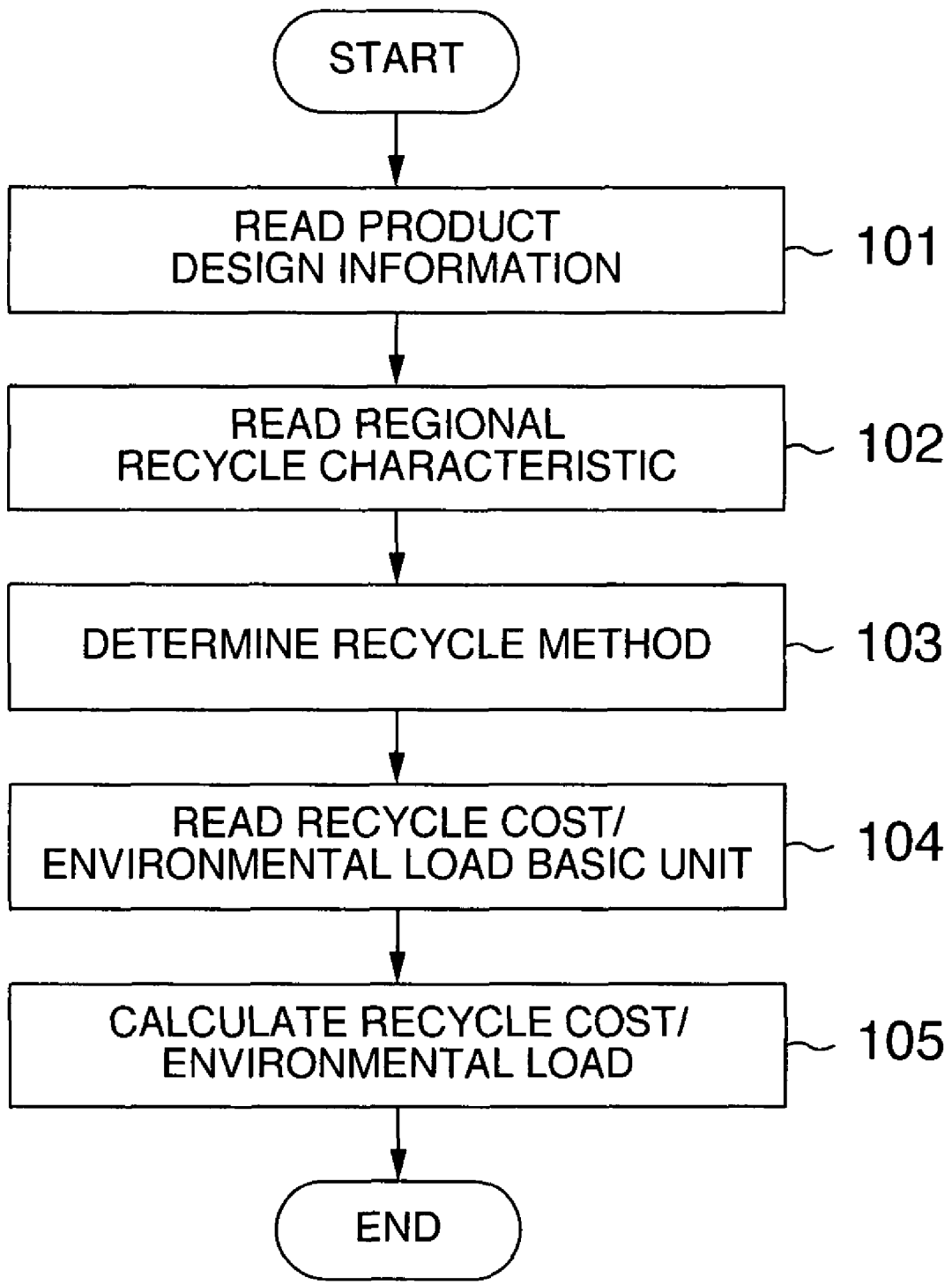
FIG. 1 is a diagram showing an example of the processing flow according to a first embodiment of the invention.
Figure 2:
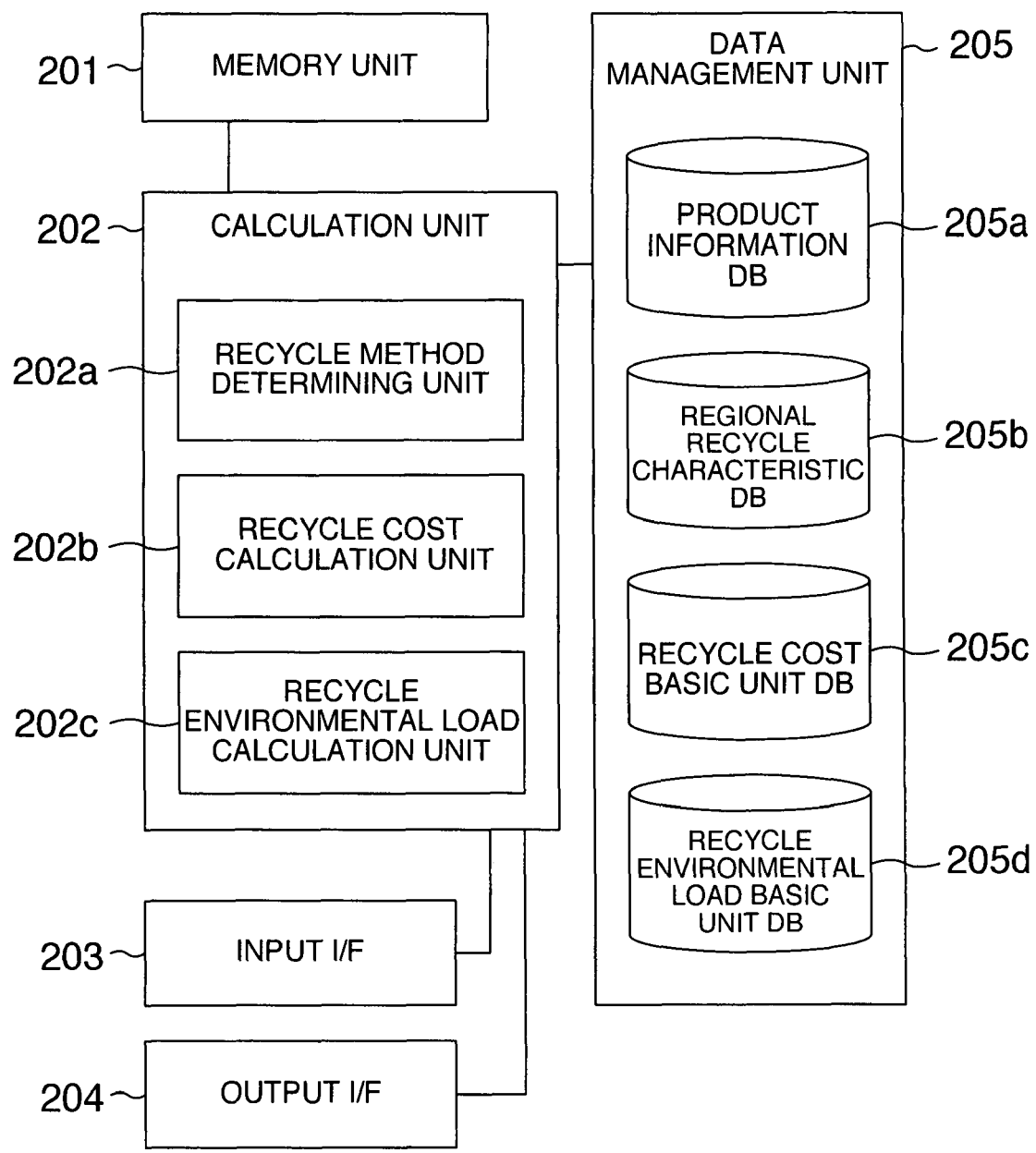
FIG. 2 is a diagram showing an example of the system configuration for realizing an example of the processing flow according to the first embodiment of the invention.

FIG. 1 shows an example of the processing flow according to this embodiment of the invention. The product information is read and stored in a memory unit 201 from a product information database 205a existing in a data management unit 205 of the system configuration according to the invention shown in FIG. 2 (step 101). An example of the general configuration of the system for implementing the invention is shown in FIG. 2. The system according to the invention comprises the memory unit 201, a calculation unit 202, an input interface 203, an output interface 204 and a data management unit 205. This configuration is not a special one but can be realized by an ordinary personal computer. The data management unit 205, for example, may be arranged in the memory unit 201 without affecting the implementation of the invention. The calculation unit 202 includes a recycle method determining unit 202a, a recycle cost calculation unit 202b and a recycle environmental load calculation unit 202c. The data management unit 205 includes a product information database 205a, a regional recycle characteristic database 205b, a recycle cost basic unit database 205c and a recycle environmental load basic unit database 205d. These component parts are existent not necessarily independently of each other, but the recycle cost basic unit database 205c and the recycle environmental load basic unit database 205d can be unified into a single database without affecting the implementation of the invention. The input interface 203 can be realized with an ordinary input device such as the keyboard and the mouse. Also, the output interface 204 can be implemented with an ordinary output device such as the monitor or the printer.

The product information database 205a includes the part configuration information for managing the parent-child relation, the quantity and the unit of the subassembly parts and the parts (hereinafter collectively referred to as the parts) making up an example of the product shown in FIG. 3A and the part attribute information indicating the attributes such as the type, material and weight of the parts and the chemical substances and the quantities contained in the parts shown in the example of FIG. 3B.

Following step 101, the regional recycle characteristic information are read from the regional recycle characteristic database 205b existing in the data management unit 205, and stored in the memory unit 201. Further, according to the first embodiment, the designation of a region or a country is input, for example, from the input interface 203 (step 102).

An ordinary example of the recycle processing flow is shown in FIG. 4.

The first product recovered is disassembled by removing certain units (portions having a predetermined function including a plurality of parts) and parts in their original form (step 401). Next, the unit thus disassembled may be disassembled again by removing units and parts (step 402). This disassembling process may be repeated further. In the case where the units and parts thus disassembled are subjected to the regenerating process such as cleaning or inspection for reuse (step 403), for example, precious metals may be recovered from the circuit board or a special process such as breaking, crushing or separation may be carried out on the units such as a motor which otherwise might be difficult to break or crush by an ordinary means in order to secure the proper process (step 404). The remaining disassembled units and parts and the portions of the product and units not disassembled (step 405) are subjected to the process called breaking or crushing into small pieces (step 406), after which the separation process is often executed to sort them by material (step 407). A device called the breaker or crusher is used for the breaking or crushing process, respectively. In many cases, the separation process includes the magnetic separation (capable of recovering iron) utilizing the characteristics of iron being attracted by a magnet, the eddy current separation (generally capable of separating conductive metals and nonconductive plastics from each other) utilizing the principle that a current (eddy current) is generated by the movement of a conductor in the vicinity of a magnet, or the gravity concentration (whereby nonmetals recovered by the eddy current separation can be separated from each other or plastics in the remainder (plastic mixtures in many cases) unrecovered by the eddy current separation can be separated from each other) utilizing the difference of specific gravity between the intended object and a heavy liquid (specific gravity adjusted to 2.0 or 3.0) or water (specific gravity of 1.0). The techniques for these processes are provided as information from many recycle processing organizations. Further, the metals subjected to the magnetic separation, the eddy current separation or the gravity concentration are refined in many cases (step 408) for use as a metal material. The plastics separated, on the other hand, are regenerated (step 409) for reuse, or burnt as a heat source (step 410). The materials (generally called the dust) not recovered by these processes are generally burnt, buried or otherwise disposed of in the final processing plant (step 411).

These recycle methods are often different for different regions or countries such as Europe, Japan or South East Asia, or in the same region or country, different for different recycle processing organizations. In Europe where the labor cost is considered relatively high, for example, the disassembly requiring manual work is comparatively few in cases. In Japan where the burial cost (final disposal cost) is high, on the other hand, the process aimed at minimization of dust (the disassembly process is carried out manually to some degree after all) is employed, while the manual disassembly process is positively executed with the aim of increasing the recovery rate of valued items in the regions relatively low in labor cost.

The conventional technique for evaluating the recycle property of a product fails to take the difference of the recycle method with different regions or countries or recycle processing organizations into consideration. According to this invention, in contrast, the recycle methods varied with the region, country and the recycle processing organization are stored in the regional recycle characteristic information database 205b. Examples of the regional recycle characteristic information database 205b are shown in FIGS. 5, 6. FIG. 5 shows an example in which the portions to be "disassembled (step 401)" by the recycle method shown in FIG. 4 are recorded for each region/country or based on the information including the type or material of or the chemical substance contained in a product or a part. This example indicates that in "Europe", "tool" and "tool stopper" are disassembled and recovered from "electric power tool"; "motor" (the vacancy of the "product/unit" column on the same row as "motor" indicates that "motor" is disassembled from any product or unit) of "100 g or more" (as indicated in the "minimum mass" column on the same row as "motor") from any product or unit; and a part containing "mercury" of "5 kg or more" from any product or unit. In "Japan", on the other hand, "tool" is disassembled from "electric power tool"; "substrate assembly", "motor" and plastics (PP and ABS) of a predetermined size or more from any product or unit; and "aluminum (Al) part" of "25 g or more" in mass from "substrate assembly" disassembled from any product or unit. The region/country, product, product type, material and chemical substance, though recorded in one database in FIG. 5, are not necessarily stored in one database, nor are all of these items necessarily covered. Also, in spite of the fact that the vacancy of the "product/unit" column of "motor" disassembled from any product or unit indicates "from any product", the intended product/unit and the intended part class can be recorded for each intended product with a similar effect. This is also the case with the other items. This is true with the other items. Also, in this example, "substrate assembly" in "Japan" is first extracted as "part class" to be disassembled, and then recorded as "product/unit" to be disassembled, while "Al" is recorded in "material code" of "substrate assembly" as an object to be disassembled. This constitutes the data extracted in "re-disassembly" (step 402) in FIG. 4. This example represents a case recorded to the effect that the material Al (data assuming an aluminum radiation plate used for radiation, etc.) placed on the substrate assembly is further disassembled from the substrate assembly.

FIG. 6 shows an example of the database for storing, by region/country, the method of processing the units, parts and the non-disassembly parts generated by "disassembly" in the recycle method shown in FIG. 4 and the method of processing the objects recovered by the particular process. This example indicates in its recording that in "Europe", for example, in the case of the disassembled "motor", after the "break/separate" process, "95%" of "iron" and "90%" of "copper" are recovered. Further, the recovered "iron" and "copper", through the "refine" process, is regenerated with the recovery rate of "90%" and "96%", respectively. In "Japan", on the other hand, the record shows that "97%" of "gold" and "94%" of "copper" are recovered from "substrate assembly" by the "copper refining" process, and "80%" of "plastics" are recycled by "regeneration". The "end" flag shown in FIG. 6 indicates that the particular process completes the recycle process, while the object recovered in the process lacking the "end" flag is transferred further to the next process. In the "break/separate" process of "motor" in "Europe", for example, "iron" and "copper" are recovered, but the process is not yet finished (the end flag is lacking in the information on this row), and the "iron refining" and "copper refining" processes are carried out to recover "iron" and "copper", respectively. This process has the "end" flag and therefore can determine that the recycle process is finished. In FIG. 6, on the other hand, "process" with no "intended object" specified is designated in each region/country. In the case under consideration, for example, "break/separate" is set for both "Europe" and "Japan" (data on the bottom row of each region/country). This is the data for presetting the processing method for the portions for which the intended process is not extracted in the extraction step of the processing method described later. Although in the case of FIG. 6, the recycle method is recorded based on the region/country such as Europe or Japan, the recycle method can be similarly recorded for each recycle processing organization, for example.

Next, the recycle method is determined by the recycle method determining unit 202a existing in the calculation unit 202 using the product information and the regional recycle characteristic information read in steps 101, 102 (step 103).

A specific method of step 103 is explained with reference to FIG. 7. The attribute (such as the part class, the material code or the chemical substance code) of each part contained in the product information read in step 101 is compared with the data stored in the items of the part class, the material code and the chemical substance code of each information record corresponding to the designated region/country included in the regional disassembly part information read from FIG. 5 in step 102. In the case where at least one coincident attribute data is contained in the information record, the part shown in FIG. 3B corresponding to the particular information record is designated as a disassembly candidate (step 701). In the case where the material code or the chemical substance code of the part of the disassembly candidate is the coincident attribute data, it is determined whether the minimum mass recorded in the particular information record is satisfied or not thereby to determine the particular part as a part intended for disassembly (step 702). By repeating this process, the units and parts intended for "disassemble" are extracted from all the parts making up the product (steps 702 to 704).

Suppose that the designated region/country is "Europe" in the case of FIGS. 3A, 3B, for example. The parent part A "electric power tool" in the highest order corresponds to the product/unit "electric power tool" in FIG. 5, and is determined as an intended disassembly part by coincidence between the part class "tool" in the information record of the product/unit "electric power tool" and the part class "tool" of the part A2 in FIG. 3B. Then, the part A4 is determined as a portion to be disassembled in view of the fact that the product/unit column of FIG. 5 is vacant (any product or unit will do), the information record of the part class "motor" is coincident with the part class "motor" of the part A4 in FIG. 3B and the weight in the information record of the part A4 in FIG. 3B is 60 g which is not less than 50 g as compared with the minimum mass 50 g in the information record of the part class "motor". Similarly, the product/unit column of FIG. 5 is vacant (any product/unit will do), the part class column is also vacant (any part class will do), the information record of the chemical substance code "Hg" is coincident with the chemical substance code "Hg" in the information record of the part A12 in FIG. 3B, and the minimum mass of the chemical substance code "Hg" in the information record of FIG. 5 is 5 g, while the weight of "Hg" of the part A12 in the information record of FIG. 3B is 30% of the part weight 200 g, i.e. 60 g which is larger than the minimum weight 5 g in the information record of FIG. 5. Thus, the part "A12" is determined as a disassembly part. By determining the part "A12" as a disassembly part, the part A1 "substrate assembly" constituting a unit including the particular part is extracted as an object to be disassembled. In the process, the part "A12" is determined as a part to be re-disassembled from the unit "A1".

Suppose that the region/country designated in step 102 in the same product information diagrams of FIGS. 3A, 3B is "Japan", on the other hand. First, the parent part A "electric power tool" in the highest order corresponds to the product/unit "electric power tool" of FIG. 5 is determined as a disassembly part by the coincidence between the part class "tool" in the information record of the product/unit "electric power tool" and the part class "tool" of the part A2 in FIG. 3B. Then, the parts A1, A4 are determined as disassembly portions in view of the fact that the product/unit column in FIG. 5 is vacant (any product or unit will do), and the information record of the part class "substrate assembly" and the information record of the part class "motor" are coincident with the part class "substrate assembly" of the part A1 and the part class "motor" of the part A4 in FIG. 3B, respectively. After that, the part A3 is determined as a disassembly portion in view of the fact that the information record of FIG. 5 including the vacant product/unit column (any product or unit will do), the vacant part class column (any part class will do), the material code "ABS" and the minimum mass 50 g and the information record of FIG. 3B including the part A3, the part class "case", the material code "ABS" and the weight of 100 g are coincident with each other in the attribute material code "ABS" and the part weight of 100 g is not smaller than the minimum mass 50 g. Then, the part A1 is determined as a disassembly portion in view of the fact that the information record in FIG. 5 including the product/unit "substrate assembly", the vacant part class column (any part class will do), the material code "A1" and the minimum mass 25 and the information record in FIG. 3B including the part A11, the part class "radiation plate", the material code "A1" and the weight 30 g coincide with each other in the attribute material code "A1" and further, the part weight 30 g is not smaller than the minimum mass 25 g.

Next, a method of extracting the processing method for the disassembled units and parts extracted in the aforementioned steps and the portions not intended for disassembly is explained with reference to a case in which the designated region/country is "Europe". First, the portion including at least the part "A3", not intended for disassembly, of the product "A" having the configuration shown in FIGS. 3A, 3B as an example and the portion including at least the parts "A11", "A13" and "A14", not intended for re-disassembly, of the re-disassembled unit "A1" in the foregoing steps are extracted as "non-disassembly parts" (step 705, step 405 in FIG. 4). Next, the processing methods are extracted for the disassembly portions extracted in steps 701 to 704 and the non-disassembly portions extracted in step 705 (steps 706 to 709).

One of all the disassembly portions and one of all the non-disassembly portions described above are selected and checked with the "intended object" in the information record corresponding to the region/country designated in FIG. 6 (step 706). In the case where any data of the coincident intended object is available, the processing method described in the processing column is read (extracted) as a processing method of the particular disassembly portion or non-disassembly portion from the information record having recorded therein the coincident intended object (step 707).

In the "regional disassembly part information" in FIG. 5 and the "regional recycle characteristic information" in FIG. 6, for example, the information record is retrieved in which the part "motor" A4 determined for disassembly coincides with the "motor" as the data in the intended object column in FIG. 6. The data in the processing column of the information record is extracted as "break/separate", and the recovery of iron 95% and copper 90% are read as objects recovered by the particular process. In the process, the iron and copper recovered by this break/separate process lack the "end" flag (FIG. 6). Then, the processing of the "iron" and "copper" is further retrieved, so that the "iron refining" and "copper refining" process executed and the recovery of iron 90% and copper 96% is read. These steps are conducted for all the disassembly and non-disassembly portions extracted in steps 701 to 704 and 705 (steps 706 to 709).

Further, with regard to the portions for which the processing method is not extracted by the method described above, as shown in the regional recycle characteristic information in FIG. 6 as an example, the information record with the vacant column of the intended object is set and the processing method specifying no intended object is recorded therein. In the case of FIG. 6, the "break/separate" process is described and the objects to be recovered in this process are also specified. In this example, each object to be recovered lacks "end flag", and therefore, the process such as iron refining, copper refining and aluminum refining is executed by a method similar to steps 706 to 709, thereby making it possible to specify the processing method and the objects to be recovered as a whole (step 710).

Next, the recycle cost and the recycle environment load corresponding to the recycle method determined in step 103 are read from the recycle cost basic unit database 205c and the recycle environmental load basic unit database 205d included in the data management unit 205 and stored in the memory unit 201 (step 104).

The recycle cost basic unit database 205c, as shown by the example in FIG. 8A, is for recording the processing method, object, basic unit (cost), measure of basic unit (unit of basic unit) and accrual unit of basic unit (unit accrued by basic unit) for each region/country. The recycle environmental load basic unit database 205d, on the other hand, as shown by the example in FIG. 8B, is for recording the processing method, object, environmental load item, basic unit (environmental load), basic unit (unit of basic unit) and accrued unit (unit accrued by basic unit) for each region/country.

In step 104, it is sufficient to extract only the information on the process extracted in step 103. No problem is posed, however, if all the basic units included in the recycle cost basic unit database 205c and the recycle environmental load basic unit database 205d are read and stored in the memory unit 201. In this case, step 104 is executed not necessarily after step 103, but may be executed at an appropriate timing between steps 101 and 105. As described above, according to this invention, most of the steps are not required to be executed in the described order, and the order of step execution has no noticeable effect on the invention.

Finally, the recycle cost calculation unit 202b and the recycle environmental load calculation unit 202c included in the calculation unit 202 calculate the recycle cost and the recycle environmental load using the recycle method determined in step 103 and the recycle cost basic unit and the recycle environmental load basic unit read in step 104 (step 105).

The recycle cost, for example, can be calculated by Equation (1) below.

$$\text{Recycle cost} = \Sigma(\text{cost basic unit for each recycle process} \times \text{recycle processing amount})/\text{cost basic unit accrual unit} \quad (1)$$

The recycle environmental load, on the other hand, can be calculated by Equation (2) below for each environmental load item.

$$\text{Recycle environmental load} = \Sigma(\text{environmental load basic unit for each recycle process} \times \text{recycle processing amount})/\text{environmental load basic unit accrual unit} \quad (2)$$

A specific explanation is given with reference to the case shown in FIGS. 5 and 8.

Figure 7:
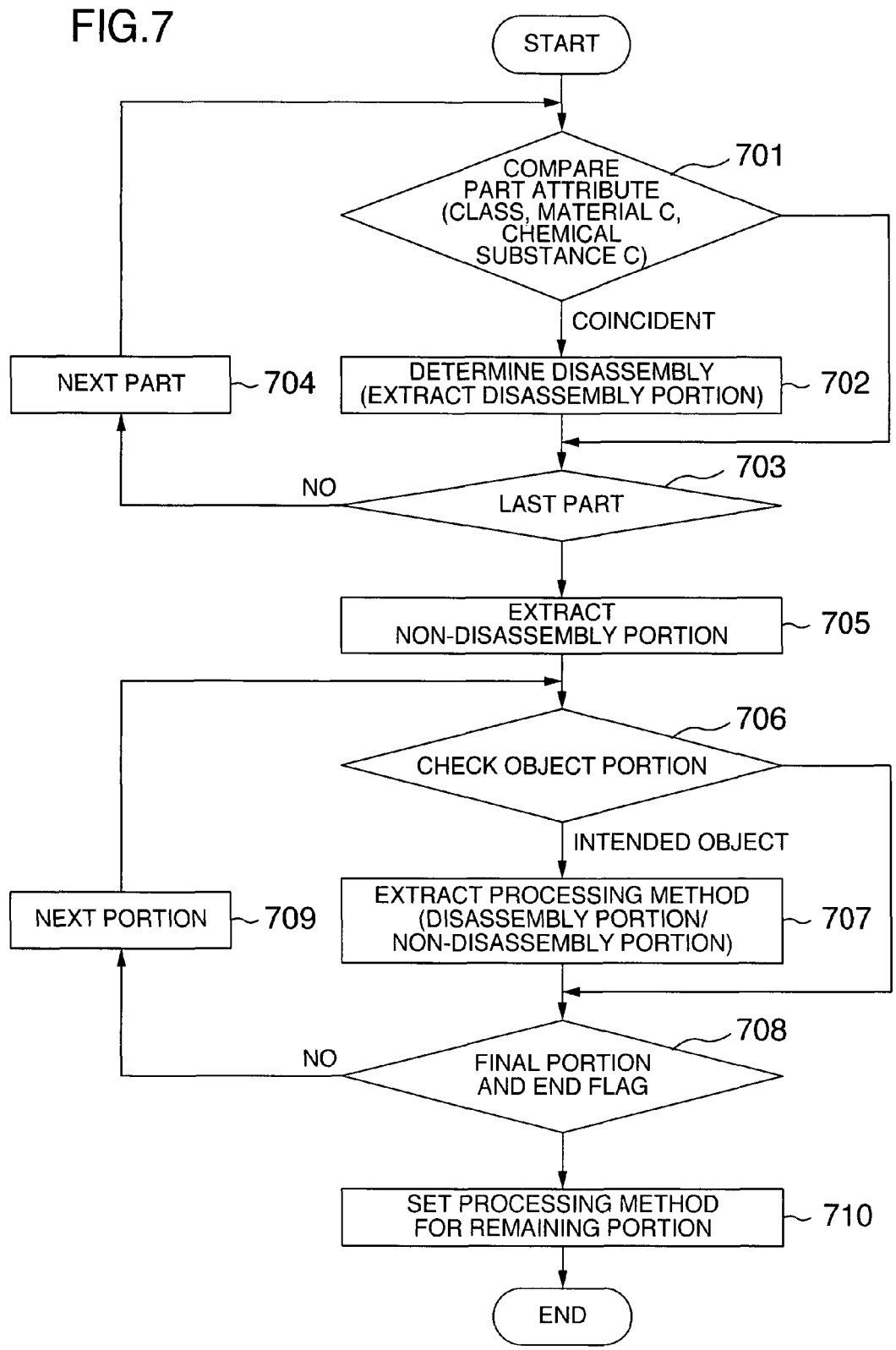
FIG. 7 is a diagram showing an example of the recycle determining method for an example of the processing flow according to the first embodiment of the invention.

With regard to the disassembly process extracted in step 702 shown in FIG. 7, the figure is "1.3" (record assumed as euro [EUR] in this case) per "s" (record assumed as "second" in this case) as the basic unit in FIG. 8. Thus, the disassembly cost can be calculated based on the information of the disassembly time of each unit or part. Incidentally, the method of calculating the disassembly time of each unit or part can be implemented by "Method and Apparatus for Ease Evaluation of Job and Process on Articles" (JP-A-6-251024) and "Yuzo Hiroshige, et. al. "Development of Disassemblability Evaluation Method", 8th International Conference on Production Engineering (ICPE) 1997/08/18", of which the detail is not described herein.

Also, with regard to the processing steps after disassembly extracted in step 707 shown in FIG. 7, the record shows that the "break/separate" process costs 10 (assumed as euro [EUR] in this case) per kg. The basic unit assumes a negative value in the case where the profit of selling the object recovered by the processing is larger than the processing cost of the various processes.

FIG. 3B shows the record of the weight of each part making up an intended product. The total weight of the intended parts (including a unit including a plurality of parts) for each process extracted in step 707 can be calculated by totaling the weight of the parts. By using the aforementioned equations for the intended weight of each process calculated and the processing unit price (basic unit/accrual unit) shown in FIG. 8A, for example, the cost of each process can be determined. The calculation by a similar method is possible also for the processing of the environmental load. Although FIG. 8B shows only "electric power" as an environmental load item of the recycle environmental load, such items as "water" and "resources", or "iron resources", "copper resources" or "gold resources" as subdivisions of "resources", or "electric power" and such as "carbon dioxide emission amount" or "soil contamination amount" for calculation of the effects of the aforementioned items can be evaluated.

Incidentally, according to this embodiment, only the information for the product recycle are stored in the regional recycle characteristic information database 205b. This database is replaced, for example, by the regional life cycle characteristic information database which, in addition to the present information of the regional recycle characteristic information database 205b, collectively manages the product manufacture process information (such as the assembly time in xx minutes), the product distribution (including transportation) process information (such as transportation distance of 500 km in the 10 t truck, transportation distance of 10 km in the 2 t truck, etc.), the product use information (water consumption of 100 l each time, power consumption of 50 W, operation time of 2 h/day, etc.), and the waste commodity recovery process information (such as transportation distance of 500 km in the 10 t truck, transportation distance of 10 km in the 2 t truck, etc.). Further, the recycle cost basic unit database 205c and the recycle environmental load basic unit database 205d are replaced by the product life cycle cost basic unit database and the product life cycle environmental load basic unit database for managing the basic unit of the cost and the environmental load of the life cycle of each product, respectively. In this way, the cost and the environmental load accrued in the product life cycle can be calculated using the product design information by the same method as described above.

According to this method, the recycle method based on the recycle characteristic varied from one region to another is determined using the product information, and based on this method, the recycle cost and the recycle environmental load can be calculated. As a result, the recycle cost and the environmental load commensurate with the characteristic of the region shipping the product can be quantitatively evaluated in the product design stage. Thus, by analyzing the factors causing the cost and the environmental load, the assistance in design improvement is made possible to reduce the cost and the environmental load.

Embodiment 2

Figure 9:
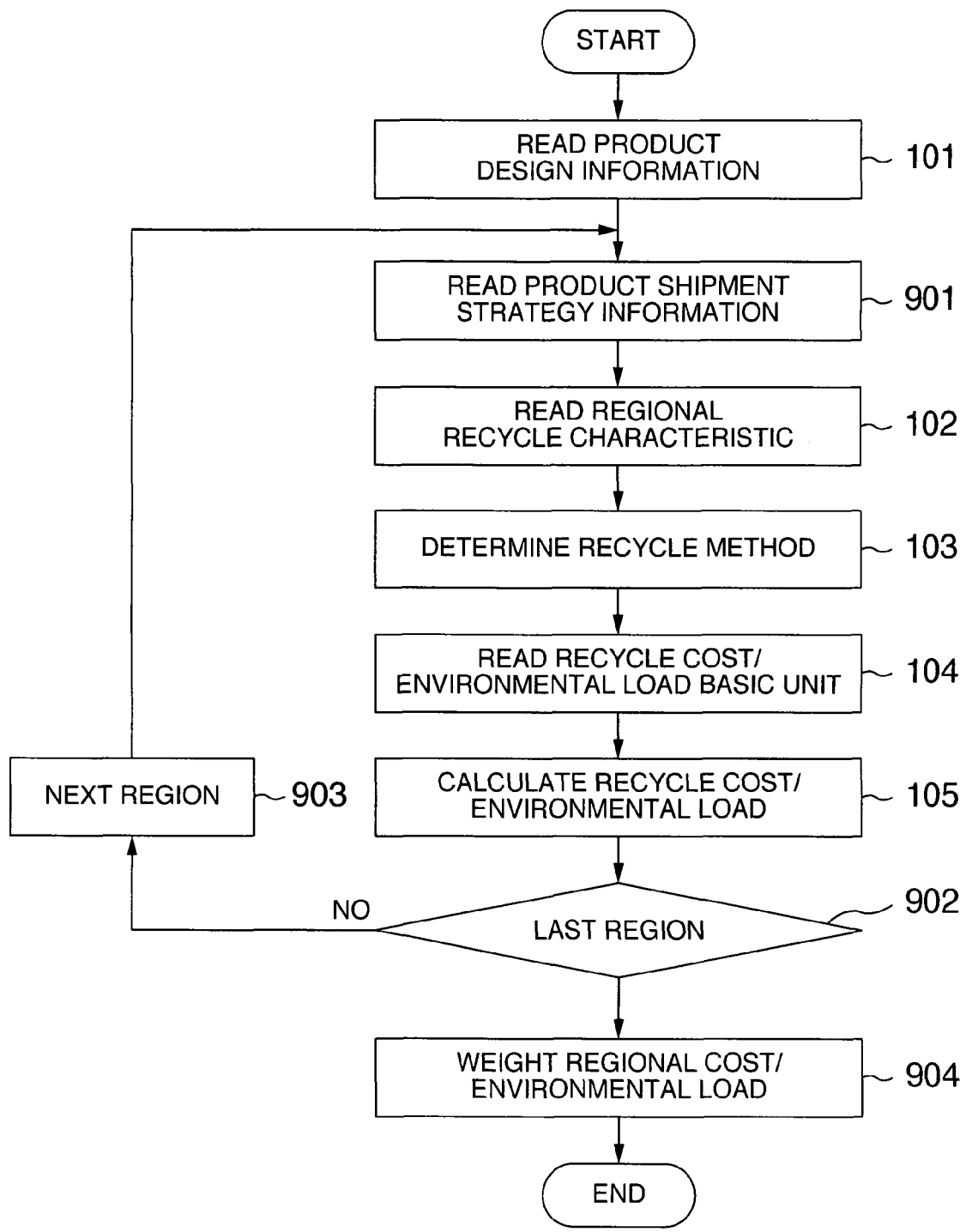
FIG. 9 is a diagram showing an example of the processing flow according to a second embodiment of the invention.
Figure 10:
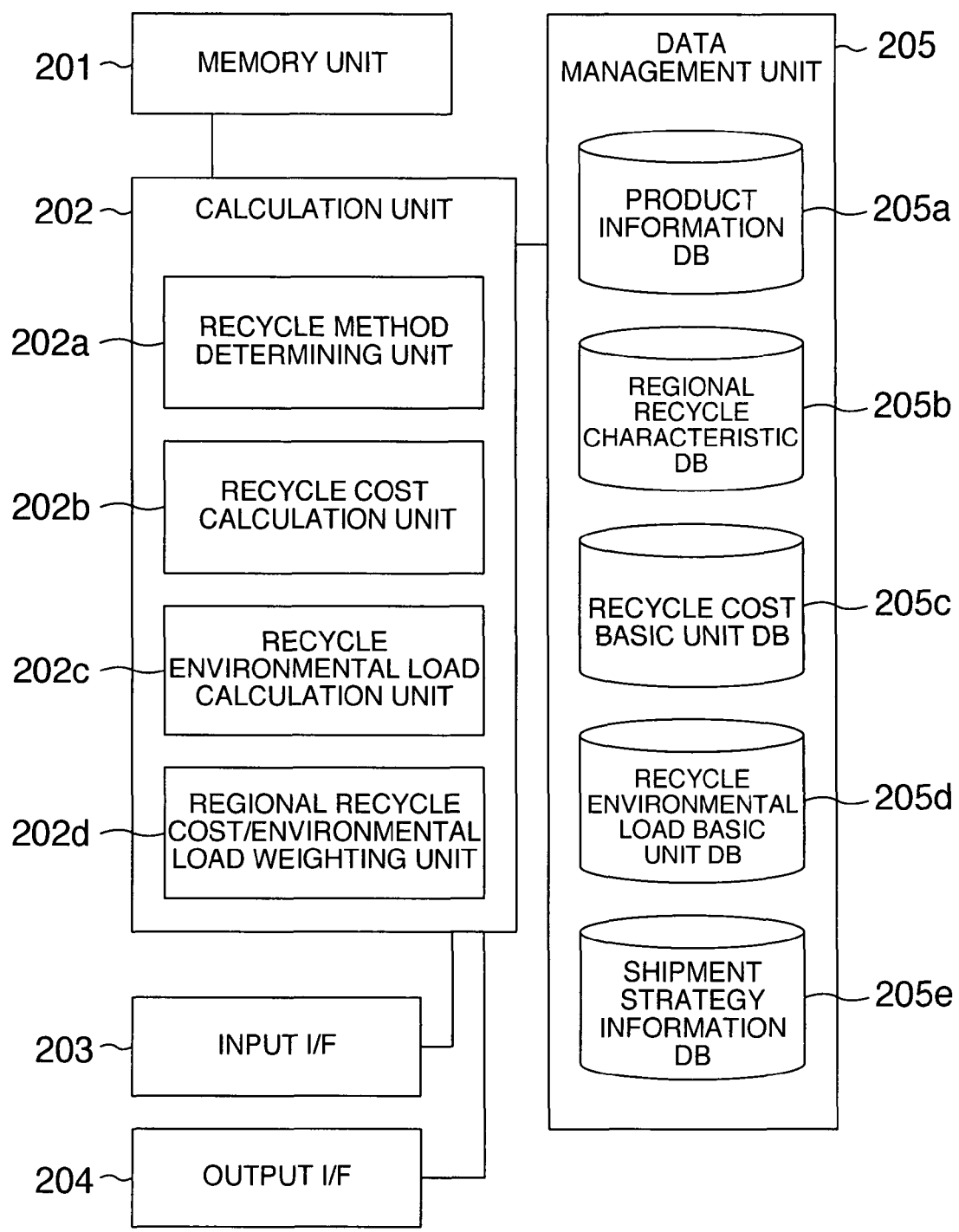
FIG. 10 is a diagram showing an example of the system configuration for realizing an example of the processing flow according to the second embodiment of the invention.

Now, another embodiment is explained with reference to FIGS. 9, 10, 11. FIG. 9 shows an example of the processing flow according to this embodiment, and FIG. 10 an example of the system configuration according to this embodiment. In this processing flow, steps 101, 102, 103, 104 and 105 are identical with the corresponding steps of the first embodiment. Between steps 101 and 102, the product shipment strategy information is read from the shipment strategy information database 205e included in the data management unit 205 and stored in the memory unit 201 (step 901). This step is not necessarily inserted between steps 101 and 102, but may replace step 101 without any problem. In most cases, the order in which the steps are executed has no noticeable effect on the invention.

The product shipment strategy information database 205e, as shown by an example in FIG. 11, manages the information including the product model, the product type such as the notebook-sized personal computer, shipment destination (country or region) and the shipment quantity (number of units). These data region held beforehand in the data management unit 205. These data are registered in the data management unit 205 in the same way as in the ordinary information system, and require no special procedure.

The process of steps 102 to 105 is repeated for each country/region constituting the shipment destination contained in the product shipment strategy information extracted in step 901 thereby to calculate the recycle cost and the environmental load for each country/region for the particular product (steps 902, 903).

Next, the regional recycle cost and environmental load are weighted by a regional recycle cost/environmental load weighting unit 202d contained in the calculation unit 202 using the calculated recycle cost/environmental load and the product shipment strategy information for each country/region according to Equations (3) and (4) below (step 904).

$$\text{Total recycle cost} = \Sigma(\text{recycle cost by country/region} \times \text{regional product shipment strategy (number of units)}) \quad (3)$$

$$\text{Total recycle environmental load} = \Sigma(\text{recycle environmental load by country/region} \times \text{regional product shipment strategy (number of units)}) \quad (4)$$

According this method, the total amount of the recycle cost and the environmental load can be calculated for each product or product type by the weighting process using the product shipment strategy (number of units shipped for each country or region) varied from one product or product type to another. As a result, a guideline for design improvement can be provided to reduce the recycle cost and the environmental load for any country having a large number of units shipped.

Embodiment 3

Figure 12:
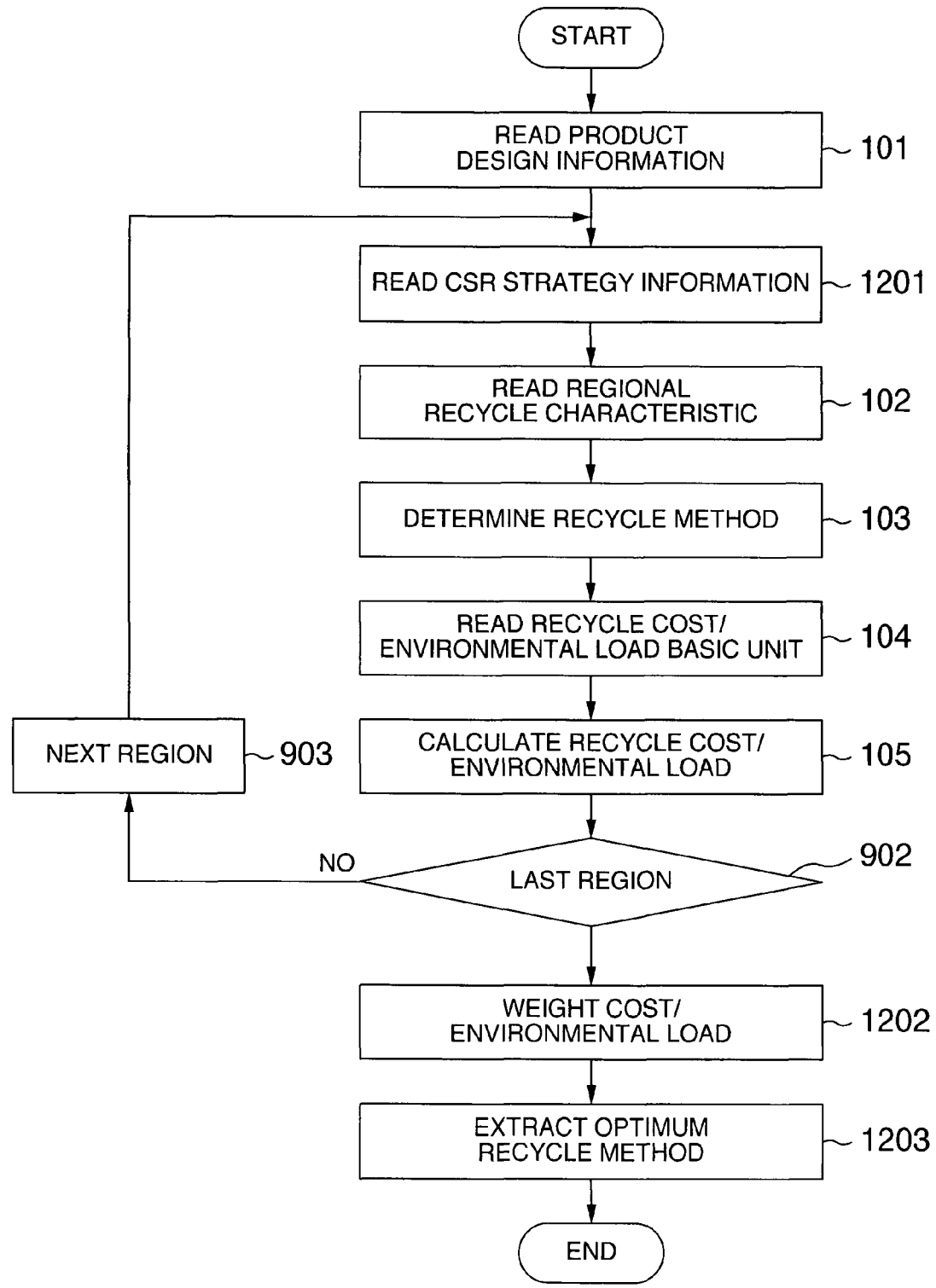
FIG. 12 is a diagram showing an example of the processing flow according to a third embodiment of the invention.
Figure 13:
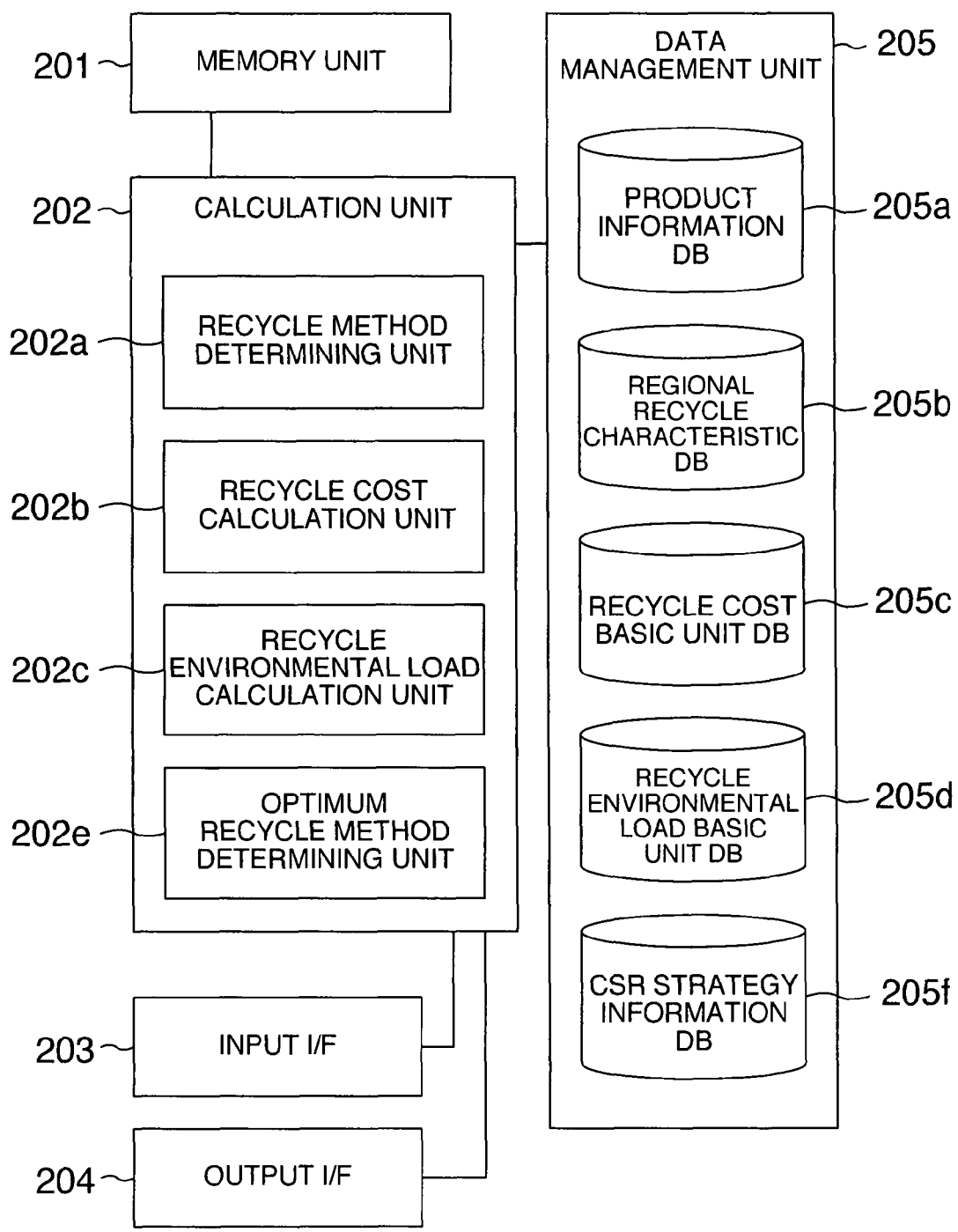
FIG. 13 is a diagram showing an example of the system configuration for realizing an example of the processing flow according to the third embodiment of the invention.

Still another embodiment is explained below with reference to FIGS. 12, 13 and 14. FIG. 12 shows an example of the processing flow according to this embodiment, and FIG. 13 an example of the system configuration according to this embodiment. In this processing flow, steps 101, 102, 103, 104 and 105 are identical with the corresponding steps in the first embodiment. Between steps 101 and 102, a step is inserted to read the CSR (Corporate Social Responsibility) strategy information of an enterprise from the CSR strategy information database 205f contained in the data management unit 205 and stored in the memory unit 201 (step 1201). This step, however, is not necessarily inserted between steps 101 and 102, but may be replaced by step 101 without any problem. In this way, the order in which the steps are executed can be changed in many cases without substantially affecting the invention. The CSR strategy information database 205f, as an example thereof is shown in FIG. 14, manages the weighting of the cost (the shown example assumes a plurality of items including the manufacturing cost and the recycle cost) and the environmental load (the shown example assumes a plurality of items including the recycle rate, the $CO_2$ emission amount and the resource exhaustion amount) for each region/country. In this case, the evaluation item such as the cost or the resource exhaustion amount which is better, the smaller the numerical value, and the evaluation item such as the recycle rate which is better, the larger the numeral value, have opposite positive and negative signs of weighting. As a result, the optimum method can be extracted by Equations (5) and (6) shown below. These data are stored beforehand in the data management unit 205. These data are registered in the same way as in an ordinary information system, and not a special one.

The process of steps 102 to 105 is repeated for each country/region constituting the shipment destination included in the CSR strategy information extracted in step 1201 thereby to calculate the recycle cost and the environmental load of the particular product for each country/region (steps 902, 903).

Next, the plurality of the calculated cost items and environmental load items for each country/region are weighted using the CSR strategy information by the optimum recycle method determining unit 202e included in the calculation unit 202 (step 1202) thereby to extract the optimum recycle method (step 1203). Examples of weighting methods using the CSR strategy information are shown below.

$$\begin{aligned}\text{Cost/environmental load weighting result} = \Sigma\{&(\text{comparative recycle method manufacturing cost information/reference recycle method manufacturing cost information}) \times \text{manufacturing cost weighting coefficient},\\ &(\text{comparative recycle method recycle cost information/reference recycle method recycle cost information}) \times \text{recycle cost weighting coefficient},\\ &(\text{comparative recycle method recycle rate information/reference recycle method recycle rate information}) \times \text{recycle rate weighting coefficient},\\ &(\text{comparative recycle method } CO_2 \text{ emission amount information/reference recycle method } CO_2 \text{ emission amount information}) \times CO_2 \text{ emission amount weighting coefficient},\\ &(\text{comparative recycle method resource exhaustion amount information/reference recycle method resource exhaustion amount information}) \times \text{resource exhaustion amount weighting coefficient}\} \quad (5)\end{aligned}$$

In this case, the result of calculation of the cost/environmental load of the recycle method first calculated may be used as a reference recycle method with the same consequence. Also, the reference recycle method may be regarded as an object of "comparison" like the other recycle methods (all the dividing operations result in unity in such a case). Although the example of weighting for the five items is shown as in FIG. 14, a similar concept applies for an increased or decreased number of items weighted.

For example, the recycle method resulting from the weighting carried out by the above-mentioned method is extracted as the optimum method as follows:

$$\text{Optimum recycle method} = \text{Min (cost/environmental load weighting result by recycle method)} \quad (6)$$

A method of extracting the optimum recycle method is explained above with reference to FIGS. 12, 13 and 14 taking the recycle method by region/country as an example. In FIGS. 5, 6, 8 and 14, however, the optimum recycle method and recycle processing organization can be extracted from the recycle methods and recycle processing organizations in the same region/country by changing the information management for each region/country and managing a plurality of recycle methods in the same region/country, i.e. the information for each recycle processing organization.

According to this method, the optimum recycle method or recycle processing organization can be selected based on the weighting (CSR strategy) as a corporate strategy for the cost and the environmental load.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A product design support method comprising database for storing:

a part component information including at least the parent-child relation, quantity and the unit as items of parts making up a product;

a part attribute information including, as component elements, the attribute information of at least the part class, weight, material code and the chemical substance content code corresponding to the part identification information;

a regional recycle disassembly part information including, as component elements, at least the disassembly product, disassembly part class, material code, chemical substance content code and the minimum mass classified by region/country;

a regional recycle characteristic information including, as component elements, at least the intended object, processing method and the recovered object classified by region/country; and a recycle cost/environmental load basic unit information including, as component elements, at least the processing method, intended object, cost basic unit and the environmental load basic unit classified by region/country;

wherein the regional disassembly part information and the regional recycle characteristic information are retrieved using a search key including the part component information and the part attribute information for the product to be evaluated and the evaluation region/country designated and input from an input I/F thereby to establish the total processing method required for recycling the product to be evaluated; and wherein the recycle cost/environmental load are quantitatively evaluated taking the regional recycle characteristic into consideration at the time of occurrence of a waste product, based on the established processing method and the recycle cost/environmental load basic unit information.

2. The product design support method according to claim 1, wherein the regional disassembly part information stored in the database indicates that the part recorded in the disassembly part class with the disassembly part not specified is disassembled without fail regardless of the disassembly product in the recycle process of a waste product in a corresponding region/country.

3. The product design support method according to claim 1, wherein the regional disassembly part information stored in the database and recorded in the chemical substance content code and the minimum mass with the disassembly part class not specified indicates that all the products or all the parts containing the chemical substance not smaller in amount than the minimum mass are disassembled without fail in the corresponding region/country.

4. The product design support method according to claim 1, wherein the regional disassembly part information stored in the database and recorded in the material code and the minimum mass with the disassembly part class not specified indicates that all the products or all the parts containing the material not smaller in amount than the minimum mass are disassembled without fail in the corresponding region/country.

5. The product design support method according to claim 1, wherein the process for establishing the total processing method required for recycling the product to be evaluated, by retrieving the regional disassembly part information and the regional recycle characteristic information using a search key including the part component information and the part attribute information for the product to be evaluated and the evaluation region/country, is executed in such a manner that:

in the case where at least selected one of the part attribute information including the part class, material code and the chemical substance content code coincides with at least selected one of the data including the disassembly part class, material code and the chemical substance content code making up the component elements of the regional disassembly part information classified in accordance with the designated and input evaluation region/country, then the corresponding part in the part attribute information is determined as a part to be disassembled;

the part determined as a part to be disassembled which coincides with the intended object of the component elements classified in accordance with the designated and input evaluation region/country in the regional recycle characteristic information is retrieved and the processing method corresponding to the coincident intended object is established as the processing method of the particular part;

in the case where the recovered object corresponding to the coincident intended object is not the final recovered object, the intended object coincident with the recovered object is retrieved further from the regional recycle characteristic information, and the process is repeated for establishing the processing method corresponding to the coincident intended object as a processing method for the recovered object; and the establishing process is repeated for all the parts making up the product to be evaluated.

6. The product design support method according to claim 1, wherein the process for quantitatively evaluating the recycle cost/environmental load based on the established processing method and the recycle cost/environmental load basic unit information taking the regional recycle characteristic into consideration at the time of occurrence of a waste product is executed in such a manner that:

the recycle cost/environmental load basic unit information classified in accordance with the designated and input evaluation region/country are retrieved and the corresponding cost basic unit and the environmental load basic unit are read with selected one of each established processing method and the processing method with the intended object as a search key; and the recycle cost and the environmental load are calculated according to the following equations:

$$\text{Recycle cost} = \Sigma\{(\text{cost basic unit for each recycle process} \times \text{recycle processing amount})/\text{cost basic unit accrual unit}\} \quad (1)$$

$$\text{Recycle environmental load} = \Sigma\{(\text{environmental load basic unit for each recycle process} \times \text{recycle processing amount})/\text{environmental load basic unit accrual unit}\} \quad (2).$$

7. The product design support method according to claim 1, wherein the database has further stored therein the shipment strategy information including, as component elements, at least the product type, shipment destination and the number of units shipped, and wherein the recycle cost and the environmental load are calculated by region/country using a weighted value including the number of units shipped to the region/ country indicating the shipment destination in the shipment strategy information for each product, and further, the total amount of the recycle cost and the environmental load is calculated for each product.

8. The product design support method according to claim 1, wherein the database has further stored therein the CSR strategy information defining the weighting coefficient for each of a plurality of classified cost items and a plurality of classified environmental load items for each region/country;

wherein the total processing method required for recycling the product to be evaluated is established for each region/country stored in the CSR strategy information;

wherein the recycle cost and the environmental load is calculated taking the regional recycle characteristic at the time of occurrence of a waste product into consideration for each of the plurality of the classified cost items and the plurality of the classified environmental load item based on the established processing method and the recycle cost/environmental load basic unit information;

wherein the result of calculating each cost item and each environmental load item based on the recycle method in a first region/country is compared, as a reference, with the result of calculating each cost item and each environmental load item based on the recycle method in a second region/country according to the following equation:

Cost or environmental load weighting result=Σ{(comparative recycle method production cost information/reference recycle method production cost information)×production cost weighting coefficient, (comparative recycle method recycle cost information/reference recycle method recycle cost information)×recycle cost weighting coefficient, (comparative recycle method recycle rate information/reference recycle method recycle rate information)×recycle rate weighting coefficient, (comparative recycle method $CO_2$ emission amount information/reference recycle method $CO_2$ emission amount information)×$CO_2$ emission amount weighting coefficient, (comparative recycle method resource exhaustion amount information/reference recycle method resource exhaustion amount information)×resource exhaustion amount weighting coefficient}     (5);

and wherein the recycle method to be compared associated with the minimum comparison result is determined as the optimum recycle method.

9. A product design support method according comprising a database for storing:

a part component information including at least the parent-child relations, quantity and the unit as items of parts making up a product;

a part attribute information including, as component elements, the attribute information of at least the part class, weight, material code and the chemical substance content code corresponding to the part identification information;

a recycle disassembly part information including, as component elements, at least the disassembly product, disassembly part class, material code, chemical substance content code and the minimum mass classified by recycle processing organization;

a recycle characteristic information including, as component elements, at least the intended object, processing method and the recovered object classified by recycle processing organization; and a recycle cost/environmental load basic unit information including, as component elements, at least the processing method, intended object, cost basic unit and the environmental load basic unit classified by recycle processing organization;

wherein the disassembly part information and the recycle characteristic information are retrieved using a search key including the part component information and the part attribute information for the product to be evaluated and the recycle processing organization to be evaluated, designated and input from an input I/F thereby to establish the total processing method required for recycling the product to be evaluated; and wherein the recycle cost/environmental load are quantitatively evaluated, taking the recycle characteristic at the time of occurrence of a waste product into consideration, based on the established processing method and the recycle cost/environmental load basic unit information.

10. A product design support system comprising:

a data management unit for managing database having stored therein: the part component information having, as component elements, at least the parent-child relation, the quantity and the unit as items of parts making up a product; the part attribute information having at least the attribute information including the part class, the weight, the material code and the chemical substance content code corresponding to the part identification information as component elements; the regional disassembly part information including at least the disassembly part, the disassembly part class, the material code, the chemical substance content code and the minimum mass as component elements classified by region/country; the regional recycle characteristic information having at least the intended object, the processing method and the recovered object as component elements classified by region/country; and the recycle cost/environmental load basic unit information having at least the processing method, the intended object, the cost basic unit and the environmental load basic unit as component elements classified by region/country;

a memory unit for reading each of the information and storing the information at the time of executing each process;

an input interface for receiving the input designating the region/country to be evaluated;

a recycle method determining unit for retrieving the regional disassembly part information and the regional recycle characteristic information using a search key including the part component information and the part attribute information for the product to be evaluated and the region/country to be evaluated, designated and input from an input I/F, thereby to establish the total processing method required for recycling the product to be evaluated;

a recycle cost calculation unit for quantitatively calculating the recycle cost taking the regional recycle characteristic at the time of occurrence of a waste product into consideration based on the established processing method and the recycle cost/environmental load basic unit information; and;

a recycle environmental load calculation unit for quantitatively calculating the recycle environmental load taking the regional recycle characteristic at the time of occurrence of a waste product into consideration based on the established processing method and the recycle cost/environmental load basic unit information.

* * * * *